United States Patent [19]
Odney

[11] 3,739,514
[45] June 19, 1973

[54] FISHING DEVICE

[76] Inventor: Erling Odney, 2604 W. Oak St., Sioux Falls, S. Dak. 57105

[22] Filed: Nov. 12, 1971

[21] Appl. No.: 198,370

[52] U.S. Cl. .................................................. 43/17
[51] Int. Cl. .......................................... A01k 97/12
[58] Field of Search ........................... 43/17, 16, 15

[56] References Cited
UNITED STATES PATENTS

| | | | |
|---|---|---|---|
| 2,409,988 | 10/1946 | Schwebs | 43/17 |
| 2,781,600 | 2/1957 | McDonnell | 43/15 |
| 2,773,326 | 12/1956 | Calvert | 43/16 |
| 2,556,628 | 6/1951 | Nisle, Sr. | 43/17 |
| 3,060,616 | 10/1962 | Woodley | 43/17 |
| 3,470,647 | 10/1969 | Horner | 43/17 |

*Primary Examiner*—Louis G. Mancene
*Assistant Examiner*—Daniel J. Leach
*Attorney*—William J. McGinnis, Jr.

[57] ABSTRACT

A fishing device including a support stand for positioning a fishing line in a fishing area and a signaling system indicating the presence of a fish striking the bait. The signaling system provides an audible signal which may be actuated by any one of several similar support stands while each individual stand may be provided with a visual signal. The fishing device support stand is comprised of a pair of legs outwardly extending from a base to which a support tower is secured. From the support tower, a generally downwardly extending fishing line supporting member extends to a position generally over the fishing area. The signaling system is actuated by movement of a normally slack fishing line from the slack position to a relatively taut position thereby moving a lever arm of a switch causing connection of electrical contacts.

4 Claims, 4 Drawing Figures

PATENTED JUN 19 1973 3,739,514
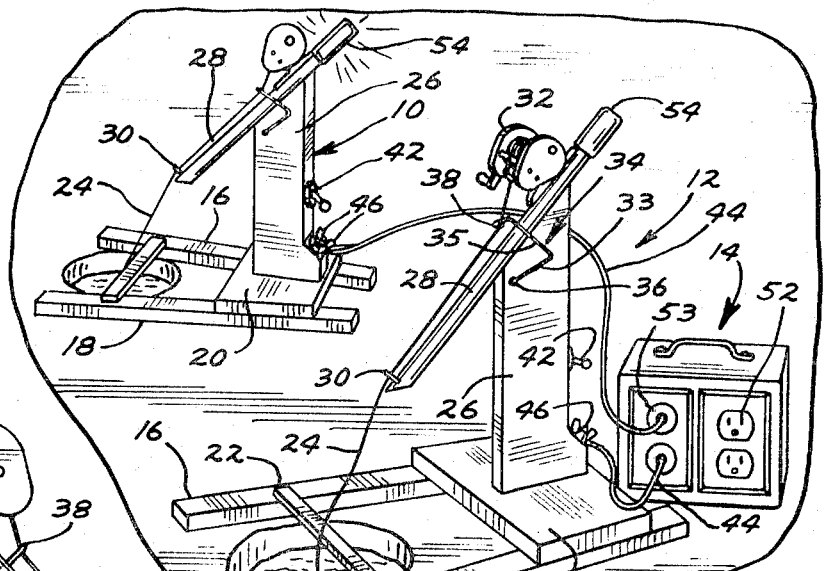
FIG. 1
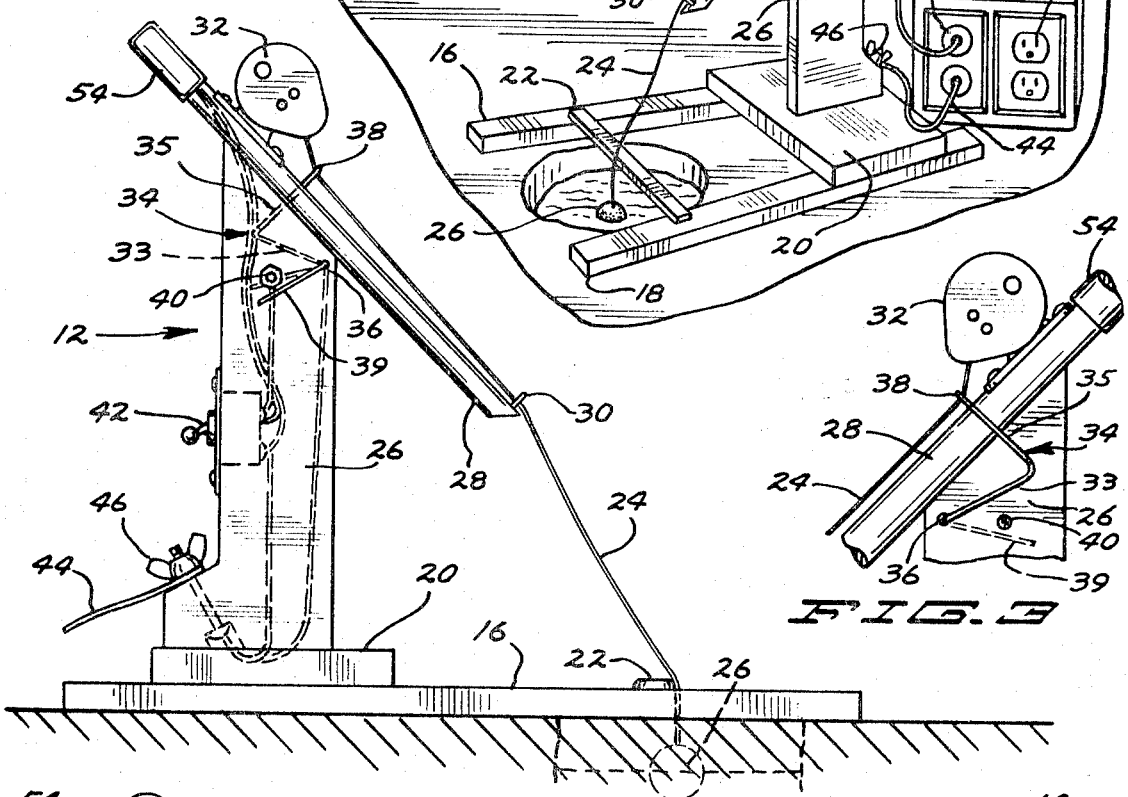
FIG. 2
FIG. 3
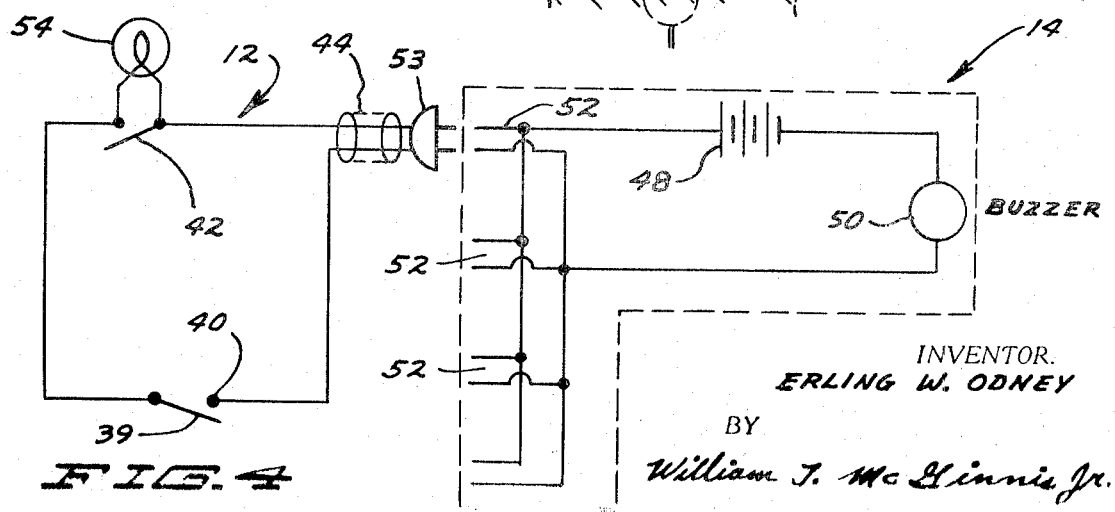
FIG. 4
INVENTOR.
ERLING W. ODNEY
BY
William J. McGinnis Jr.
ATTORNEY

FISHING DEVICE

BACKGROUND OF THE INVENTION

This invention relates to fishing devices, generally, and more particularly to fishing devices comprising signaling systems indicating the presence of fish at the lure, such as may be used by ice fisherman in winter.

Many fishing devices are known which are designed to hold a conventional fishing rod and reel of any of the well known commercially available types. Such devices are of course somewhat awkward in that in addition to the conventional fishing equipment means must be provided for securing the device to the existing rod and reel plus the actual equipment concerned with the fishing device itself. Such devices are of the type that when movement of the fishing rod in a holder is sensed the device will sound an alarm or trip a spring to set the hook in the fish's mouth. Such devices may have some lack of sensitivity because the fish at the bait must exert enough force to move the entire system rather than a small portion thereof. Also, skilled ice fisherman do not find it convenient to manipulate a fishing line on a fishing rod because of line drag and frequently use a hand held line so that the fish can be readily hooked. In addition, it is possible that some of these devices hold the conventional fishing rod and reel in such a fashion as to damage them. It is clear that it would be desirable for a fisherman to have a line tending device which would allow easy manipulation of the fishing line while freeing the fisherman from having to hold the line all the time.

In addition, it would be desirable to have a signaling system so that a fisherman need not tend his line continuously but may divert his attention elsewhere until a fish is present and nibbling at the lure. Thus, a fisherman may desire to engage in a card game with several other fisherman while at a distance somewhat removed from his fishing line. In addition, in some situations, it is legal for a fisherman to have more than one fishing line out at a time and in such situations all lines cannot be watched sinultaneously, and it is desirable to have a signaling system indicating not only that a fish is present at a lure but which of the various fishing lines is being bothered by the fish.

Consequently, it would be desirable to have a fishing device designed for holding a set line rather than a fishing device designed to adapt a conventional rod and reel to a set line purpose. In addition, it is clear that it is desirable to have a signaling system capable of relatively high sensitivity in signaling the presence of a fish at the bait while at the same time indicating, if necessary, which of a plurality of such fishing devices has attracted a fish.

SUMMARY OF THE INVENTION

A fishing device is provided for supporting a fishing line over a fishing area. The fishing device further comprises a signaling system for audibly and/or visually indicating that a fish has been attracted to and is bothering the lure.

The fishing device is comprised of a fishing stand having a pair of legs horizontally outwardly extending from a base towards the fishing area and a vertical support tower extending upwardly from the base. From the top of the tower a generally downwardly extending fish line supporting member is positioned generally over the fishing area and disposed at a point between the outwardly extending legs. The fishing line is supported on the fish line supporting member and extends downwardly over the end thereof where it is retained by a fish line guide.

In the normally slack condition of a fishing line, such as would be provided with the fishing lure supported by a buoyant float, commonly known as a bobber, an arm controlling an electrical switch is engaged with the fishing line and tends to remain in the open position. As the fishing line becomes comparatively taut, through movement of the bobber as the fish nudges the lure, the arm engaged with the fishing line tends to move the electrical contact into a closed position causing a flow of electrical current to the signaling device.

In the form of the invention disclosed herein, an audible signaling device is provided at a remote location which may serve as the audible signal for other similar fishing devices while the fishing stand portion of the fishing device has a visual signal which may be used by the fisherman to isolate which of a plurality of baits has attracted a fish when his attention has been attracted by the audible signaling device from his plurality of set lines.

IN THE FIGURES

FIG. 1 is an illustration showing apparatus according to my invention shown in position at ice fishing holes.

FIG. 2 is a right side elevational view of a portion of the fishing device according to my invention with portions shown in dotted line view.

FIG. 3 is a detailed broken away left hand elevational view of a portion of the fishing device according to my invention.

FIG. 4 is an electrical schematic diagram for the fishing device according to my invention.

DESCRIPTION OF THE PREFERRED EMBODIMENT

Referring now to FIG. 1, fishing apparatus, according to my invention, comprising a pair of devices 10 and 12, are shown connected to a single signal box 14, forming part of the device. Each fishing device has a bottom portion having a pair of legs 16 and 18 to which a platform or base 20 is mounted and which secures the legs 16 and 18. A cross bar 22 connects the legs at a point removed from the platform 20 to add rigidity to the structure and to aid in positioning a fishing line 24 which is in turn connected to a bobber 26 floating in the water, at an ice fishing hole for example. The line 24 rests lightly on the cross bar 22, and will tend to remain fixed in position so that the bobber and line will not tend to float to the edge of the hole and freeze to the edge thereof.

Mounted to the base 20 is an upright tower member 26 which supports at the uppermost end thereof a downwardly inclined fishing line supporting member 28. The downward attitude of member 28 allows easy manipulation of the fishing line. The topmost end of the tower 26 may be cut at an angle, as shown in the drawings, to facilitate attachment of the fishing line supporting member. At the outermost end of the fishing line supporting member 28 is an eye 30 through which the line 24 is trained. In the form of the invention shown, an ordinary fishing reel 32 is mounted to the fishing line supporting member and provides a source of fishing line for the fisherman. A fishing reel such as 32 need not necessarily be used, however, as the appropriate length of line may be directly secured or wrapped around a line holding post, for example, and the fishing line manipulated by hand in a conventional manner familiar to ice fishermen. That is, a reel is not necessarily needed for implementation of my invention but is only a convenience, as most ice fishermen are already adept at manipulating a fishing line in their hands without the aid of a reel. My invention eliminates the need for the line to be hand held at all times, however.

As best seen in FIGS. 2 and 3 an electrical switch element 34 is mounted through a hole 36 in the tower 26. The electrical switch element as shown in the drawings for this embodiment of the invention is formed with an angle shaped portion 33 on the left side of the tower extending first backwardly and then upwardly so as to be perpendicular in the upward extension portion 35 to the general path taken by the fishing line 24. The topmost end of portion 35 of the member 34 is positioned with an eyelet 38 for engagement with the fishing line 24. On the right side of the tower a switch contact arm 39 extends from the portion of element 34 axially running through the hole 36 and which is pivotably mounted therein to a switch contact 40.

It will be appreciated from FIG. 2 in which the fishing line 24 is shown in a relatively slackened position that when a fish nibbles at the bait on the fish line below the surface of the water, causing movement of the bobber 26, the slack in the line 24 will tend to be taken up causing movement of the upwardly extending portion 35 of the switch element 34. This movement will tend to bring the switch contact arm 39 into contact with the switch contact 40. The switch element 34 is connected to a wire running inside the tower. Thus, it can be seen that the nibbling of the fish on the bait will cause actuation of the sensitively positioned switch element causing the actuation of an electrical circuit.

The tower is provided, as shown in FIG. 2, with a switch 42 as will be explained shortly. In addition, wire 44 is connected at one end to an electrical post 46 and at the other end to the signal box 14. For example, as shown in this embodiment of the invention, regular household extension cord type wire is connected between the electrical box 14 and the fishing device and ordinary household plugs and receptacles may be used in constructing the electrical circuit.

Referring now to FIG. 4, the electrical circuit within the signal box 14 is shown enclosed in dotted line box 14. A source of electrical potential 48 is connected in series with a signal device such as a buzzer 50, for example. The other leads of the buzzer and of the source of electrical potential are connected respectively to opposite leads in the receptacles 52. The left hand portion of FIG. 4, not within box 14 indicates the circuit in the fishing stand portion of the device. The circuitry in the fishing stand 12 includes an electrical switch formed by switch arm 39 and electrical contact 40 in series with a visual indicating element 54 such as a lightbulb, shown appropriately enclosed. Referring briefly to FIGS. 1 and 2, the visual indicating element 54 may be incorporated at the upper end of the fishing line supporting element 28.

The switch 42 on the tower portion of the fishing device acts, as shown schematically in FIG. 4, to bypass the visual indicating element 54 when it is not required or desired, leaving only an audible signal. The selection of the signal element 50 and the potential source 48 and the visual indicating element 54 will be made so that the element 50 will work approximately as well regardless of whether or not it is in series with the visual indicating device 54 or not. It is relatively easy for example to find a buzzer, battery and light combination in which the buzzer will work to produce an audible signal whether it is in series with the lightbulb or not and still provide adequate illumination of the lightbulb when the lightbulb is in the circuit. Plug 53 secured to the end of connecting wires 44 connects to the electrical box 14. As many or as few devices may be connected to the electrical box 14 as desired without affecting the operation. When a fish contact is made, the light 54 on the individual fishing rig where the fish is nibbling is lighted while the sounder 50 in the box 14 operates for all fishing devices.

It is clear from the foregoing description that an audible signaling element may be mounted directly on the fishing device and need not be located remotely as shown here. It is clear however that additional advantages of the fishing device according to my invention may be obtained from the remote location of the audible signaling element so that a plurality of fishing lines may be set up at one time.

What is claimed is:

1. An ice fishing device comprising:
   a. a generally downwardly extending fishing line supporting member,
   b. a fishing line supported by said member,
   c. means for supporting said fishing line supporting member generally over a fishing area, said means comprising a pair of generally horizontal legs extending outwardly from a base, said base supporting a tower to which said fishing line support member is secured,
   d. a cross bar extending between said legs for positioning over an ice fishing hole and in engagement with said fishing line to prevent freezing of the line to the edge of the hole,
   e. an arm associated with said supporting member for movement from a first position engaged with said fishing line in a relatively slack condition to a second position when said fishing line is in a comparatively taut position, and,
   f. means actuated by movement of said arm for actuating an electrical circuit.

2. A fishing device comprising:
   a. a generally downwardly extending fishing line supporting member,
   b. a fishing line supported by said supporting member,
   c. means for supporting said fishing line supporting member generally over a fishing area, said means comprised of a pair of generally horizontal legs extending outwardly from a base, said base supporting a tower to which said fishing line support member is secured,
   d. an arm associated with said member for movement from a first position engaged with said fishing line in a relatively slack condition to a second position when said fishing line is in a comparatively taut position,
   e. an electrical circuit actuated by movement of said arm,
   f. said arm being connected to an angle portion extending to an axial portion passing through said tower member and pivotally mounted therein and in which said arm further includes an electrical connection to one portion of said electrical circuit and wherein said arm moves into and out of engagement with an electrical contact associated with a second portion of said electrical circuit to effect operation of said electrical circuit.

3. The structure of claim 2 and further including a visual signaling device, connected in said electrical circuit.

4. The structure of claim 2 and further including in said electrical circuit an audible signaling device.

* * * * *